United States Patent
Herter et al.

(10) Patent No.: US 8,002,100 B2
(45) Date of Patent: Aug. 23, 2011

(54) DEVICE FOR ACTUATING A DIAPHRAGM SPRING CLUTCH FOR VEHICLES

(75) Inventors: Peter Herter, Ravensburg (DE); Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 821 days.

(21) Appl. No.: 12/064,265

(22) PCT Filed: Aug. 11, 2006

(86) PCT No.: PCT/EP2006/007984
§ 371 (c)(1),
(2), (4) Date: Feb. 20, 2008

(87) PCT Pub. No.: WO2007/022889
PCT Pub. Date: Mar. 1, 2007

(65) Prior Publication Data
US 2008/0242507 A1     Oct. 2, 2008

(30) Foreign Application Priority Data

Aug. 24, 2005   (DE) .................... 10 2005 039 922

(51) Int. Cl.
*F16D 48/06* (2006.01)
*F16D 25/08* (2006.01)
(52) U.S. Cl. ............... 192/85.56; 192/85.52; 192/85.57; 192/85.63
(58) Field of Classification Search .............. 192/85.52, 192/89.24, 85.56
See application file for complete search history.

(56) References Cited

U.S. PATENT DOCUMENTS

| | | | |
|---|---|---|---|
| 5,042,631 A * | 8/1991 | Ellenberger et al. ....... | 192/85.57 |
| 6,298,969 B1 | 10/2001 | Nagler et al. | |
| 6,540,059 B2 | 4/2003 | Drexl | |
| 6,907,975 B2 * | 6/2005 | Doremus et al. ........... | 192/85.51 |
| 2005/0051408 A1 | 3/2005 | Schwenger et al. | |
| 2005/0233858 A1 | 10/2005 | Smith et al. | |

FOREIGN PATENT DOCUMENTS

| | | |
|---|---|---|
| DE | 195 40 921 A1 | 5/1997 |
| DE | 199 45 806 A1 | 5/2000 |
| DE | 199 18 164 A1 | 10/2000 |
| DE | 199 19 328 A1 | 11/2000 |
| DE | 100 18 630 A1 | 10/2001 |
| DE | 101 63 438 A1 | 7/2003 |
| DE | 103 16 419 A1 | 11/2003 |
| DE | 103 20 020 A1 | 11/2004 |
| EP | 0 710 580 A1 | 5/1996 |
| EP | 1 484 654 A2 | 12/2004 |
| WO | WO-01/20200 A1 | 3/2001 |
| WO | WO-02/25131 A1 | 3/2002 |
| WO | WO 03/019026 A1 * | 3/2003 |

* cited by examiner

*Primary Examiner* — Richard M. Lorence
(74) *Attorney, Agent, or Firm* — David & Bujold, P.L.L.C.

(57) ABSTRACT

The invention concerns a device for actuating a diaphragm spring clutch (20) for vehicles by means of a pneumatic, hydraulic or electric actuator (24), comprising a controller connected upstream of the actuator (24), whose output control variable actuates the actuator (24). To compensate for the strong nonlinearity of the releasing force over the releasing stroke that is typical of diaphragm springs, a controller is used, whose characteristic curve is plotted in such a way that this nonlinear curve of the releasing force is at least approximately compensated via a correspondingly coordinated actuation of the actuator (24), so that it remains essentially identical over the releasing stroke.

9 Claims, 2 Drawing Sheets

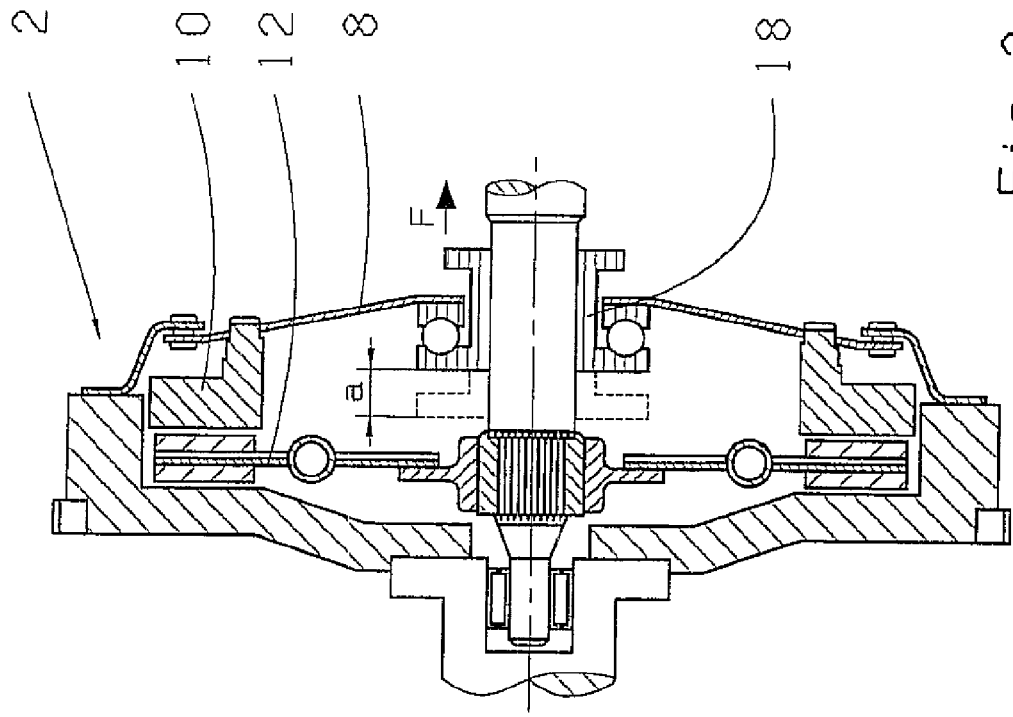
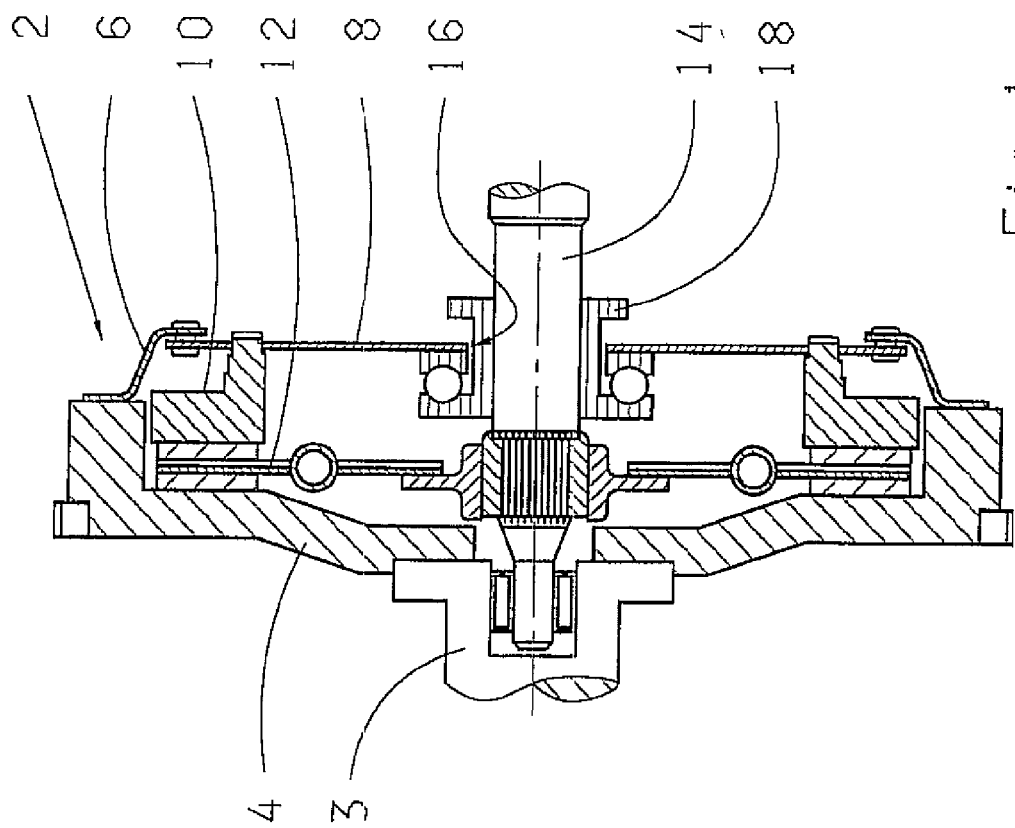

DEVICE FOR ACTUATING A DIAPHRAGM SPRING CLUTCH FOR VEHICLES

This application is a national stage completion of PCT/EP2006/007984 filed Aug. 11, 2006, which claims priority from German Application Serial No. 10 2005 039 922.3 filed Aug. 24, 2005.

FIELD OF THE INVENTION

The invention concerns a device for actuating a diaphragm spring clutch for vehicles.

BACKGROUND OF THE INVENTION

Diaphragm spring clutches are frequently used as starting clutches in connection with automatic transmissions in motor vehicles. A diaphragm spring frequently serves to deliver that contact pressure with which the clutch pressure plates and clutch disks, provided with a friction lining, are brought into frictional engagement with each other. In order to disengage the clutch, the pressure plate must be lifted off the allocated clutch disk, for which reason the diaphragm spring, which loads the pressure plate, must be moved against the pressure force applied thereby. In practice, the clutch release elements, moved by an actuator, engage with the diaphragm spring, via a suitable lever arm, so that the releasing force to be applied by the clutch release elements is, in any case, smaller than the pressure force to be applied by the diaphragm spring.

The actuator is controlled by a controller connected upstream thereof, which delivers the control variables for the actuator. The differences between single-disk, dry clutches and multi-disk, dry clutches, as well as drawn and pressed clutches, are not discussed in detail herein, since the functional principle is the same in all of these clutch types and the disadvantages, which will be described below, occur in equal measure. Basically pneumatic, hydraulic or electric actuators are taken into consideration as actuators, even though pneumatic or hydraulic actuators are predominantly used in automotive technology.

A basic disadvantage of the diaphragm springs in connection with vehicle clutches is their strongly non-linear releasing force characteristic, i.e., the curve of the releasing force over the releasing stroke. This releasing force characteristic is marked by very steep curves, with which the releasing force changes very strongly over a predetermined releasing stroke, alternating with very flat curves, with which essentially no force change occurs over a large releasing stroke.

The releasing force is non-linearly dependent on the releasing stroke according to this releasing force characteristic. This non-linear releasing force leads to a change of the travel amplification depending on the releasing stroke or the release position of the clutch release elements and the actuator. Herein the term "travel amplification" is understood as the reaction of the controlled system to a predetermined actuating variable of the actuator. The controlled system comprises for example a diaphragm spring, release bearing, release fork and actuator. This reaction of the controlled system to a predetermined adjustment variable can be accordingly changed depending on the position.

If this fact is not taken into consideration (for example, during the configuration of the controller), this leads to a very sluggish controller behavior (the times required to reach the desired position are very long) in areas with low travel amplification or the controller tends to vibrate in areas with a high travel amplification.

Against this background, the invention has the goal of creating a device for actuating a diaphragm spring clutch for vehicles in which the travel amplification is at least approximately identical over the entire releasing stroke and has a value at which the controller behavior is neither sluggish nor tends to vibrate.

SUMMARY OF THE INVENTION

The invention is based on the realization that the travel amplification, that is, the reaction of the controlled path to an actuating variable, depends, upon the respective releasing force at a specific point of the releasing stroke, but also upon the actuating variable of the actuator active at this point so that it is possible to influence or purposefully select the travel amplification by way of a corresponding modification of the adjusting force for the purpose of the above-mentioned object.

Accordingly, the invention is based on a device for actuating a diaphragm spring clutch for vehicles by way of a pneumatic, hydraulic or electric actuator comprising a controller connected upstream of the actuator, whose output control value controls the actuator.

In order to attain the above-mentioned goal, the use of a controller is envisioned, whose characteristic curve (output control variable over input desired value) is plotted in such a way that the non-linear curve of the releasing force (releasing force over releasing stroke) particular to the diaphragm spring is compensated for to such an extent that the travel amplification remains at least approximately identical and the controller behavior is neither sluggish nor tends to vibrate.

Since it is technically possible to design controllers in such a way that they have a desired characteristic curve, it is possible in this way by overlapping the releasing force characteristic of the diaphragm spring and a suitable characteristic line of the controller to compensate the non-linear curve of the releasing force characteristic and provide the travel amplification with the desired properties.

As was already mentioned above, the devices for the actuation of a diaphragm spring clutch are generally equipped with pneumatic or hydraulic actuators, which are controlled via inlet and outlet valve arrangements. According to a preferred embodiment of the invention, this type of controller is designed in such a way that it outputs an actuating variable which corresponds to the predetermined characteristic to the valve arrangements of the actuator depending upon the releasing position of the clutch.

The control variable of the controller and the control variable of the actuator actuated by it are, therefore, provided in such a way at each point of the releasing stroke that the travel amplification resulting therefrom remains at least approximately identical over the entire releasing stroke and has the desired magnitude.

In order to create the greatest possible area for the fluid throughput with a device having a pneumatic or hydraulic actuator, which is actuated via controlled inlet and outlet valve arrangements, it is already known how to use valve arrangements with two or more valves which are arranged parallel to each other and can be switched on separately and which can be successively connected for an increase of the fluid throughput. In order to avoid an erratic change of the fluid throughput and thus of the actuating variable of the adjusting mechanism in the changeover points, a valve arrangement actuates the respectively active valves. Their throughput is actuated by way of a correspondingly plotted characteristic line of the controller in such a way during the switching on and off of the individual valves, according to a further embodiment of the invention, that the resulting travel amplification does not change at the switchover point.

According to a preferred embodiment of the invention, each valve arrangement comprises a first valve with a larger orifice diameter and a second valve with a smaller orifice diameter, whereby both valves are active above a predetermined control variable of the controller and only the second valve is active below this control variable. The value by which the valve control must be changed during the switchover can be calculated from the physical valve parameters (orifice diameter, etc.). Because only the valve with the small orifice diameter is actuated with small control variables (below the predetermined control variable of the controller), considerably more accurate positioning is made possible without negatively influencing the controller coordination.

According to a preferred embodiment of the invention, the valves of a valve arrangement can be two-position valves with a controllable pulse frequency. The throughput of the valves is accordingly controlled, not by means of a change of the valve passage cross-section, but by way of the number of opening/closing cycles in the time unit. Such valves, with a simple construction and ease of control handling, manifest a high functionality and functional accuracy.

The resulting travel amplification of the system can also be influenced by a varying supply pressure of the inlet valve arrangement. In this case, according to a further embodiment of the invention, the characteristic curve of the controller can be plotted in such a way that the supply pressure of the inlet valve arrangement, which varies over the release stroke of the clutch, is likewise compensated for the purpose of a travel amplification that remains identical so the control variable of the controller is thus modified depending on the supply pressure.

The characteristic line for the compensation of the non-linearity of the diaphragm spring can also have a direct effect on the controller parameters, according to another embodiment of the invention, and can change the latter for the purpose of a travel amplification which remains identical over the release stroke of the clutch.

BRIEF DESCRIPTION OF THE DRAWINGS

The invention will now be described, by way of example, with reference to the accompanying drawings in which:

FIG. 1 shows a conventional diaphragm spring clutch for vehicles in engaged condition;

FIG. 2 shows the diaphragm spring clutch of FIG. 1 in disengaged condition;

DETAILED DESCRIPTION OF THE INVENTION

Figure 3:
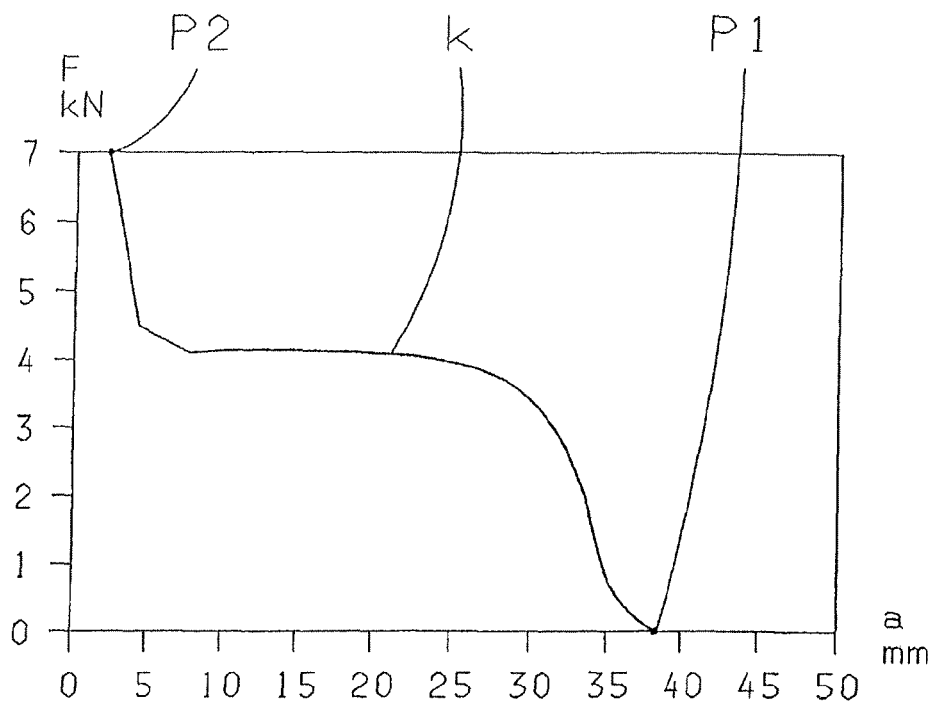
FIG. 3 shows a diagram of a release characteristic line for a diaphragm spring clutch according to FIGS. 1 and 2.

FIG. 1 shows a longitudinal section of a diaphragm spring clutch 2 with a conventional design. The diaphragm spring clutch 2 comprises a flywheel 4 connected to a crankshaft 3, which supports a diaphragm spring 8 by way of a basket-shaped connecting part 6. The diaphragm spring 8 has an approximately annular-shaped configuration. It is connected at its periphery to the connecting part 6. A pressure ring 10 is affixed on the diaphragm spring 8 radially inwardly from the periphery and abuts on the clutch disk 12 in the engaged position of the clutch, shown in FIG. 1, and presses the latter on the flywheel 4 and produces a frictional engagement, between the pressure ring 10 connected to the flywheel 4 and the clutch disk 12. The clutch disk 12 is rigidly connected to a transmission input shaft 14 so that the transmission input shaft 14 is rotationally connected to the crankshaft 3 in the engaged position of the clutch, shown in FIG. 1.

The diaphragm spring 8 has a central opening 16 through which a clutch release element 18 engages with an actuator (not depicted), which serves to disengage the clutch, as is depicted in FIG. 2.

FIG. 2 shows the diaphragm spring clutch 2 in a disengaged condition. The clutch release element 18 has been moved to the right by the releasing stroke a and has taken with it the diaphragm spring 8, as well as the pressure ring 10 connected to it, to such an extent that there is no longer frictional engagement between the pressure ring 10 and the clutch disk 12 so that the clutch 2 is disengaged.

A releasing force F is applied by an actuator 24 to displace the clutch release element 18 from the position depicted in FIG. 1 into the position depicted in FIG. 2.

FIG. 3 shows the curve of the releasing force F over the releasing stroke a and corresponds (from left to right) to the movement of the clutch release element 18 during the engagement of the clutch 2. Point P1 corresponds accordingly to the condition depicted in FIG. 1, that is, the engaged condition in which the clutch release element 18 does not transfer a force to the diaphragm spring 8, while point P2 of progression curve k corresponds to the condition in FIG. 2 which the clutch release element 18 has to apply a high releasing force.

The progression curve k is visibly very non-linear which is typical of diaphragm springs. Without suitable compensation, such a progression curve can result in the travel amplification, that is, the reaction of the controlled path to an actuating variable of the actuator which remains identical, varying over the releasing stroke, which was already explained in detail above.

A compensation for the purpose of a travel amplification, which remains identical over the releasing stroke, occurs via a controller connected upstream of the actuator.

Figure 4:
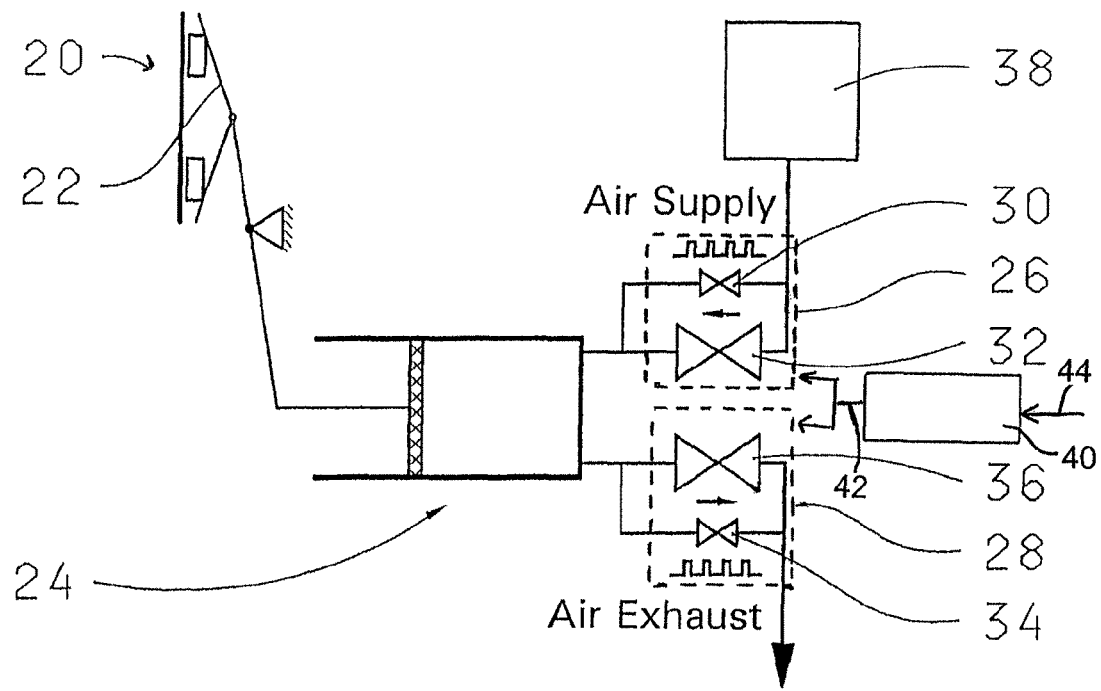
FIG. 4 shows a schematic of the circuit diagram of a device for actuating a diaphragm spring clutch by means of a pneumatic actuator.

FIG. 4 shows a schematic of a diaphragm spring clutch 20 with a diaphragm spring 22, which can be actuated via a pneumatic or hydraulic actuator 24, as already described in connection with FIGS. 1 and 2. The actuator 24 is actuated via a controller 40 controlling a controllable inlet valve arrangement 26 and a controllable outlet valve arrangement 28 for providing compressed air or hydraulic pressure to the single actuating chamber 25 of the actuator 24 wherein the controller 40 receives a controller input 42 representing a desired displacement of the actuator 24 and thus of the diaphragm spring 22 and generates a corresponding controller output 44 to control inlet valve arrangement 26 and outlet valve arrangement 28 accordingly.

The inlet valve arrangement 26 includes two two-position valves 30 and 32, whose opening/closing frequency is controllable. The valve 30 has a small orifice diameter and the valve 32 has a larger orifice diameter.

Similarly, the valve arrangement 28 has two two-position valves 34 and 36, wherein the valve 34 has a smaller orifice diameter and the valve 36 has a larger orifice diameter.

The inlet valve arrangement 26 is connected to a compressed air or hydraulic pressure source 38, which delivers supply air or hydraulic fluid with a specific supply pressure required for the displacement of the actuator 24.

As already explained above, the actuator 24 is displaced against the force of the diaphragm spring 22 in order to release the diaphragm spring clutch 20, that is, the cylinder of the actuator 24 is supplied with compressed air via the inlet valve arrangement 26. If the control variable of the controller 40 is above a predetermined limit, both valves 30, 32 are actuated. If the control variable is below this limit, only valve 30 with the smaller orifice diameter is actuated.

In order to prevent an erratic change of the travel amplification in this phase, the valve actuating variable, in this case the valve frequency of the valve 30 corresponding to the throughput of the valve 32 which is discontinuing, is modified so that the throughput continuously follows the previous throughput achieved with the two valves. The value by which the valve actuation must be changed during the changeover can be calculated from the physical valve parameters (orifice diameter, etc.).

Because only the valve with the small orifice diameter is actuated when the control variables are small (control variable below the predetermined limit), a considerably more accurate positioning is made possible without negatively influencing the controller coordination.

In order to engage the diaphragm spring clutch 20, the compressed air or hydraulic pressure located in the cylinder of the pneumatic actuator 24 is similarly discharged in a controlled manner via the outlet valve arrangement 28.

REFERENCE NUMERALS 2 diaphragm spring clutch
3 crankshaft
4 flywheel
6 connecting part
8 diaphragm spring
10 pressure ring
12 clutch disk
14 transmission input shaft
16 central opening
18 clutch release element
20 diaphragm spring clutch
22 diaphragm spring
24 pneumatic actuator
26 inlet valve arrangement
28 outlet valve arrangement
30 two-position valve
32 two-position valve
34 two-position valve
36 two-position valve
38 compressed air source
a releasing stroke
F releasing force
k progression curve
P1 point on k
P2 point on k

The invention claimed is:

1. A device for actuating a clutch (2) in a vehicle via one of a pneumatic actuator and a hydraulic actuator, the device comprising:
    an actuator (24) having an actuation chamber (25) and communicating with a diaphragm spring (8) of the clutch (2) for actuating the clutch (2), the diaphragm spring (8) providing the clutch (8) with a releasing force (F) that varies over a length of a release stroke (a) wherein the releasing force (F), plotted over the release stroke (a), is a nonlinear curve (k); and
    a controller (40) located upstream of the actuator (24) is connected to the actuator (24) such that a controller output (42) generated by the controller (40) in response to a controller input (44) the controller (40) representing a desired displacement of the actuator (24) displaces the actuator against the releasing force (F) of the diaphragm spring (8) and a characteristic curve of the controller output (42), with respect to the controller input (44), at least approximately overlaps the nonlinear curve of the release force (F) of the diaphragm spring (8);
    the controller (40) includes an inlet valve arrangement (26) which has at least first and second independently actuatable valves (30, 32) of different orifice diameters operating in parallel to provide an actuating pressure to the actuating chamber (25) of the actuator (24) and an outlet valve arrangement (28) includes at least first and second independently actuatable valves (34, 36) of different orifice diameters operating in parallel for releasing the actuating pressure from the actuating chamber (25) of the actuator (24), and the at least first and the second independently actuatable valves (30, 32, 34 36) of the input valve arrangement (26) and the output valve arrangement (28) are actuatable so that a travel amplification resulting therefrom does not change at a switchover point in the nonlinear curve of the release force (F) of the diaphragm spring 8.

2. The device according to claim 1, wherein the first independently actuatable valve (32; 36) of each of the inlet and the outlet valve arrangements (26, 28) has a larger orifice diameter and a second independently actuatable valve (30; 34) has a smaller orifice diameter, and both of the first and the second independently actuatable valves (30, 32; 34, 36) are active above a predetermined control variable of the controller, and only the second independently actuatable valve (30; 34) is active below this control variable.

3. The device according to claim 1, wherein the first and the second independently actuatable valves are, respectively, two-position valves with a controllable opening/closing frequency.

4. The device according to claim 1, wherein the characteristic curve of the controller is plotted such that a supply pressure of the inlet valve arrangement (26), which varies over the releasing stroke of a clutch (20), is compensated for a purpose of a travel amplification which remains identical.

5. The device according to claim 1, wherein the characteristic curve of the controller has a direct effect on controller parameters.

6. The device of claim 1, wherein the characteristic curve of the controller is plotted such that a supply pressure of the inlet valve arrangement (26), which varies over the releasing stroke of the clutch (20), maintains overlapping between the nonlinear curve (k) of the release force (F) of the diaphragm spring (8) and the characteristic curve of the controller.

7. The device of claim 1, wherein the characteristic line of the controller has a direct effect on controller parameters.

8. A device for actuating a clutch (2) in a vehicle, the device comprising:
    an actuator (24) communicating with a diaphragm spring (8) of the clutch (2) for actuating the clutch (2), the diaphragm spring (8) providing the clutch (8) with a releasing force (F) that varies over a length of a release stroke (a),
    wherein the releasing force (F), plotted over the release stroke (a), is a nonlinear curve (k);
    a controller (40) located upstream of the actuator (24) is connected to the actuator (24) such that a controller output (42), generated by the controller (40) in response to a controller input (44) to the controller (40) representing a desired displacement of the actuator (24), displaces the actuator (24) against the releasing force (F) of the diaphragm spring (8), and a characteristic curve of the controller output (42), with respect to the controller input (44), at least approximately overlaps the nonlinear curve of the release force (F) of the diaphragm spring (8);

the controller (40) includes an inlet valve arrangement (26) and an outlet valve arrangement (28);

the inlet valve arrangement (26) has at least first and second independently actuatable valves (30, 32) arranged in parallel and the outlet valve arrangement (28) has at least first and second independently actuatable valves (34, 36) arranged in parallel, the at least first and second independently actuatable valves (30, 32) of the input valve arrangement (26) and the at least first and second independently actuatable valves (34, 36) of the output valve arrangement (28) are independently actuatable such that when the at least first and second independently actuatable valves (30, 32; 34, 36) of one of the input valve arrangement (26) and the output valve arrangement (28) are independently actuated, a travel amplification resulting therefrom does not change at a switchover point in the nonlinear curve of the release force (F) of the diaphragm spring (8), and the first independently actuatable valve (32; 36) of each of the inlet valve arrangement (26) and the outlet valve arrangement (28) comprises a larger orifice diameter and the second independently actuatable valve (30; 34) of each of the inlet valve arrangement (26) and the outlet valve arrangement (28) comprises a smaller orifice diameter, the first independently actuatable valve (32; 36) and the second independently actuatable valve (30; 34) are both active above a predetermined control variable of the controller, and only the second independently actuatable valve (30; 34) is active below the predetermined control variable.

9. The device of claim 8, wherein the first and the second independently actuatable valves (30, 32; 34, 36) are, respectively, two-position valves with a controllable opening/closing frequency.

* * * * *